(12) United States Patent
Maruyama

(10) Patent No.: US 10,845,084 B2
(45) Date of Patent: Nov. 24, 2020

(54) INFRARED LIGHT RECEIVING WINDOW FOR LIGHT RECEIVING ELEMENT

(71) Applicant: Mitsubishi Electric Corporation, Tokyo (JP)

(72) Inventor: Hiromi Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 16/073,010

(22) PCT Filed: Mar. 18, 2016

(86) PCT No.: PCT/JP2016/058746
§ 371 (c)(1),
(2) Date: Jul. 26, 2018

(87) PCT Pub. No.: WO2017/158827
PCT Pub. Date: Sep. 21, 2017

(65) Prior Publication Data
US 2019/0049141 A1    Feb. 14, 2019

(51) Int. Cl.
*F24F 11/89*     (2018.01)
*H04B 10/114*    (2013.01)
*G01J 1/02*      (2006.01)
*H04Q 9/00*      (2006.01)
*H04B 10/116*    (2013.01)
*H04Q 9/02*      (2006.01)

(52) U.S. Cl.
CPC .............. *F24F 11/89* (2018.01); *G01J 1/02* (2013.01); *G01J 1/0238* (2013.01);
(Continued)

(58) Field of Classification Search
CPC .............................. F24F 11/89; H04B 10/114
See application file for complete search history.

(56) References Cited

U.S. PATENT DOCUMENTS

| 5,986,787 A     | * | 11/1999 | Ohshima  | ............... | H04B 10/40 398/127 |
| 2008/0165310 A1 | * | 7/2008  | Senoue   | ............. | H04B 10/1141 349/116 |
| 2008/0317475 A1 | * | 12/2008 | Pederson | ............... | H04B 10/40 398/135 |

FOREIGN PATENT DOCUMENTS

| JP | 62-031236   | * | 2/1987 | ............. F24F 11/02 |
| JP | 62-031236 U |   | 2/1987 |                          |

(Continued)

OTHER PUBLICATIONS

Office action dated Jan. 8, 2019 issued in corresponding JP patent application No. 2018-505194 (and English translation thereof).
(Continued)

*Primary Examiner* — Nathan M Cors
(74) *Attorney, Agent, or Firm* — Posz Law Group, PLC

(57) ABSTRACT

An air conditioner according to the present invention includes: a remote controller that transmits an infrared signal containing operation instruction information; and an air-conditioner main body. The air-conditioner main body includes a black window, a light-receiving element, and a white window. The black window allows the infrared signal to pass therethrough and has transmittance equal to or greater than a first value in a first wavelength range that is an infrared wavelength range. The light-receiving element receives the infrared signal. The white window is disposed between the black window and the light-receiving element and has transmittance equal to or greater than a second value in the first wavelength range, the second value being smaller than the first value. A ratio of transmittance of the white window in a second wavelength range to the transmittance of the white window in the first wavelength range is smaller than a ratio of transmittance of the black window in the second wavelength range to the transmittance of the black
(Continued)

window in the first wavelength range, the second wavelength being a range of wavelengths shorter than the wavelengths in the first wavelength range.

4 Claims, 5 Drawing Sheets

(52) U.S. Cl.
CPC ......... *H04B 10/114* (2013.01); *H04B 10/116* (2013.01); *H04Q 9/00* (2013.01); *H04Q 9/02* (2013.01)

(56) References Cited

FOREIGN PATENT DOCUMENTS

| JP | 05-223275 | A | | 8/1993 | |
|---|---|---|---|---|---|
| JP | 3041970 | U | | 7/1997 | |
| JP | 09-227987 | A | | 9/1997 | |
| JP | 11-069466 | A | | 3/1999 | |
| JP | 2004-101334 | | * | 4/2004 | ............... G01J 1/04 |
| JP | 2004-101334 | A | | 4/2004 | |

OTHER PUBLICATIONS

Office Action dated May 28, 2019 issued in corresponding JP patent application No. 2018-505194 (and English translation).
International Search Report of the International Searching Authority dated May 24, 2016 for the corresponding International application No. PCT/JP2016/058746 (and English translation).
Extended European Search Report dated Jan. 29, 2019 issued in corresponding EP patent application No. 16894445.2.
Office Action dated Dec. 4, 2019 issued in corresponding CN patent application No. 201680083382.6 (and English translation).

* cited by examiner

INFRARED LIGHT RECEIVING WINDOW FOR LIGHT RECEIVING ELEMENT

CROSS REFERENCE TO RELATED APPLICATION

This application is a U.S. national stage application of International Patent Application No. PCT/JP2016/058746 filed on Mar. 18, 2016, the disclosure of which is incorporated herein by reference.

TECHNICAL FIELD

The present invention relates to an air conditioner and an indoor unit that perform infrared communication.

BACKGROUND

In general, air conditioners are controlled by using remote controllers. A remote controller and a main body of an air conditioner communicate with each other using an infrared signal. In Patent Literature 1, an air conditioner is disclosed in which an air-conditioner main body includes an infrared-light receiving window that allows an infrared signal to pass therethrough and a light-receiving element that receives the infrared signal. For the air conditioner disclosed in Patent Literature 1, when an operation instruction signal is transmitted in the form of an infrared signal by an operation instruction signal transmitter, the operation instruction signal passes through the light-receiving window and is received by the light-receiving element of the air conditioner main body.

PATENT LITERATURE

Patent Literature 1: Japanese Patent Application Laid-open No. 11-69466

In recent years, air conditioners have been required to have design suitability, and there have been increased demands for not only the air conditioners in conventional white color, but also air conditioners in dark colors that suit a room as part of the interior of the room. While a white light-receiving window through which an infrared ray passes has been used for a white air conditioner, a black light-receiving window may be used from a design suitability standpoint.

When an air conditioner is used in a large room, such as a living room, an air-conditioner main body is required to receive an infrared signal that includes an operation instruction information from a remote controller located far away from the air-conditioner main body. A black light-receiving window having high infrared transmittance is typically used to maintain a communication distance similar to the communication distance as found in using a white light-receiving window. When a black light-receiving window having high infrared transmittance is used, unfortunately, noise, or light emitted by a fluorescent lamp enters the light-receiving window due to this high infrared transmittance. This results in a problem of failure to maintain a communication distance similar to the communication distance as found in the use of a white light-receiving window.

SUMMARY

The present invention has been achieved in view of the above, and an object of the present invention is to provide an air conditioner that uses a black light-receiving window but can maintain a communication distance even when the window is illuminated by a fluorescent lamp present.

To solve the problem described above and achieve the object described above, an air conditioner according to the present invention includes: a remote controller to transmit an infrared signal containing operation instruction information; and an air-conditioner main body, the air-conditioner main body comprising: a first light-receiving window to allow the infrared signal to pass through the first light-receiving window, the first light-receiving window having transmittance equal to or greater than a first value in a first wavelength range that is an infrared wavelength range; a light-receiving element to receive the infrared signal; and a second light-receiving window disposed between the first light-receiving window and the light-receiving element and having transmittance equal to or greater than a second value in the first wavelength range, the second value being smaller than the first value. A ratio of transmittance of the second light-receiving window in a second wavelength range to the transmittance of the second light-receiving window in the first wavelength range is smaller than a ratio of transmittance of the first light-receiving window in the second wavelength range to the transmittance of the first light-receiving window in the first wavelength range, the second wavelength range being a range of wavelengths shorter than the wavelengths in the first wavelength range.

An air conditioner according to the present invention produces an effect of maintaining a communication distance even when a black light-receiving window is used and is illuminated by a fluorescent lamp present.

DETAILED DESCRIPTION

Exemplary embodiments of an air conditioner and an indoor unit according to the present invention are described in detail below with reference to the drawings. The present invention is not limited to the embodiments.

First Embodiment

Figure 1:
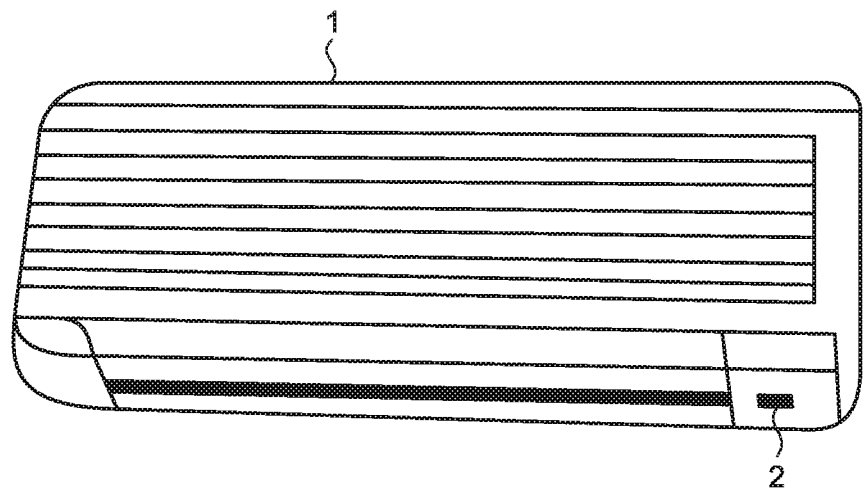
FIG. 1 is an external view of an air-conditioner main body according to a first embodiment of the present invention.
Figure 2:
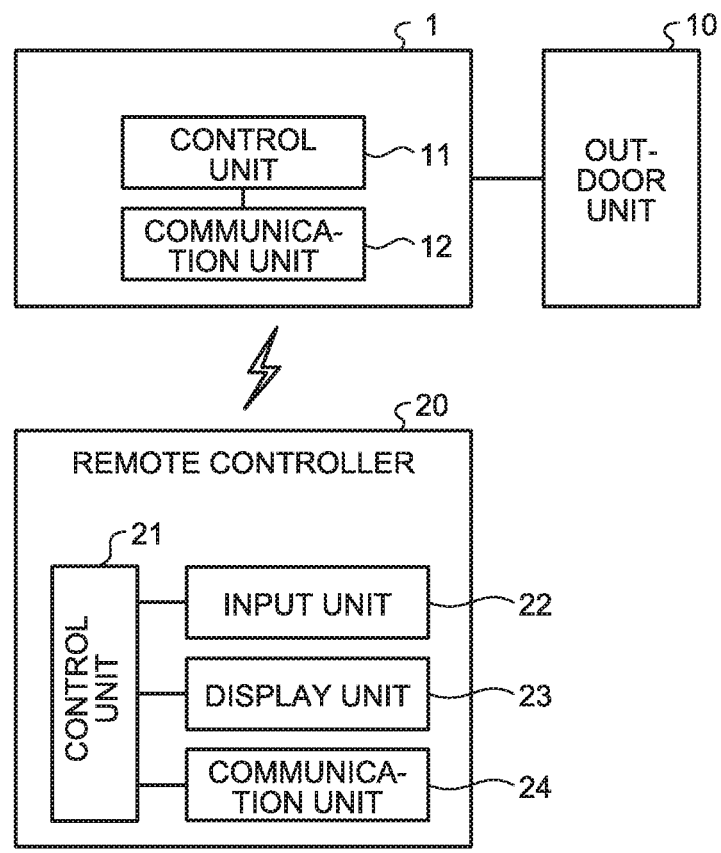
FIG. 2 is a diagram illustrating an exemplary configuration of an air conditioner according to the first embodiment.

FIG. 1 is an external view of an air-conditioner main body according to a first embodiment of the present invention. An air-conditioner main body 1 illustrated in FIG. 1 includes a light-receiving window 2 that allows an infrared ray to pass therethrough. FIG. 2 is a diagram illustrating an exemplary configuration of the air conditioner according to the first embodiment. The air conditioner according to the first embodiment includes the air-conditioner main body 1, which is an indoor unit for installation in a room, a remote controller 20, and an outdoor unit 10.

Functional configurations of the air-conditioner main body 1 and the remote controller 20 are also illustrated in FIG. 2. As illustrated in FIG. 2, the air-conditioner main body 1 includes a control unit 11 and a communication unit 12. The communication unit 12 is a receiver that receives a signal transmitted by the remote controller 20. The control unit 11 controls air conditioning on the basis of an operation instruction signal received from the remote controller 20 or a control signal input through operation of an input unit, such as a switch not illustrated, of the air-conditioner main body 1. A configuration and an operation for controlling the air conditioning in an air conditioning system according to the present embodiment are similar to those of a general air conditioning system; thus, their detailed description is omitted.

The remote controller 20 includes a control unit 21, an input unit 22, a display unit 23, and a communication unit 24. The control unit 21 controls the input unit 22, the display unit 23, and the communication unit 24. The input unit 22 is a button, a touch panel, or the like and receives an input from a user. The display unit 23 is a liquid crystal monitor or the like and displays information to the user. The input unit 22 is operated by the user, thereby generating input information. The control unit 21 generates operation instruction information for transmission to the air-conditioner main body 1 on the basis of the input information and outputs the operation instruction information to the communication unit 24. The communication unit 24 is a transmitter that transmits an operation instruction signal in the form of an infrared signal, the operation instruction signal containing the operation instruction information. The operation instruction information is control information for instructing to start operation and instructing an operation mode, which includes cooling and heating, temperature setting, an amount of airflow, and the like.

Figure 3:
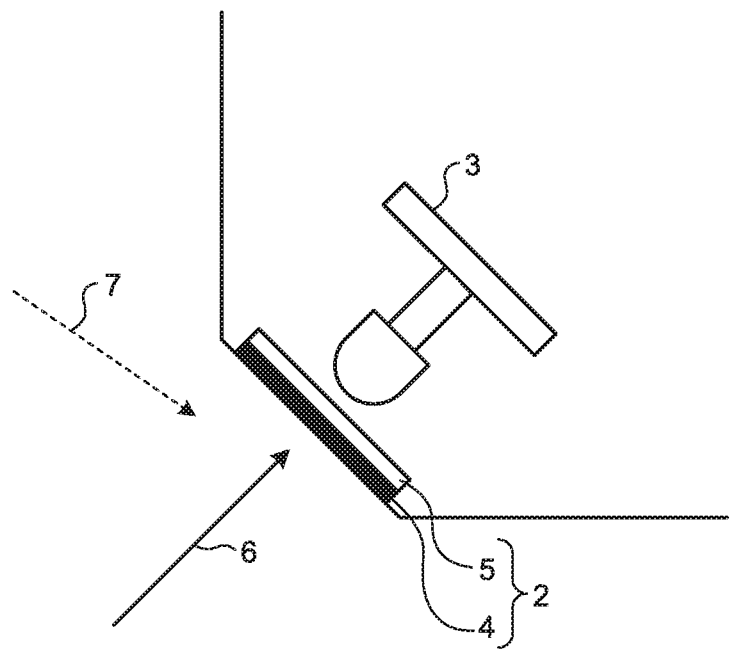
FIG. 3 is a diagram schematically illustrating a section of a light-receiving window and a light-receiving element according to the first embodiment.

FIG. 3 is a diagram schematically illustrating a section of the light-receiving window 2 and a light-receiving element according to the first embodiment. The light-receiving window 2 and a light-receiving element 3 illustrated in FIG. 3 are part of the communication unit 12. The infrared signal transmitted by the remote controller 20 passes through the light-receiving window 2 and reaches the light-receiving element 3. The light-receiving element 3 converts the infrared signal to an electric signal and outputs the electric signal to the control unit 11 illustrated in FIG. 2. The control unit 11 controls the air conditioner on the basis of an operation instruction signal, which is the electric signal. The light-receiving window 2 is disposed at, for example, a lower left portion of a front face of the air-conditioner main body 1 as illustrated in FIG. 1 (a lower right portion of FIG. 1. The position of the light-receiving window 2 is not limited to the example in FIG. 1.

As illustrated in FIG. 3, the light-receiving window 2 according to the first embodiment is defined by a black window 4 and a white window 5. The black window 4 is exposed to the outside. The white window 5 is adjacent to the black window 4 and disposed between a light-receiving element 3 and the black window 4. Both of an infrared signal 6 transmitted by the remote controller 20 and fluorescent lamp noise 7 emitted by a fluorescent lamp enter the light-receiving window 2. The black window 4 is a light-receiving window made of a material having higher transmittance in an infrared range than that of the white window 5.

The black window 4 is made by, for example, coloring acrylic resin with a black pigment. The white window 5 is made by, for example, coloring transparent polystyrene (PS) resin, methyl methacrylate butadiene styrene (MBS) resin, or the like with a white pigment.

Figure 4:
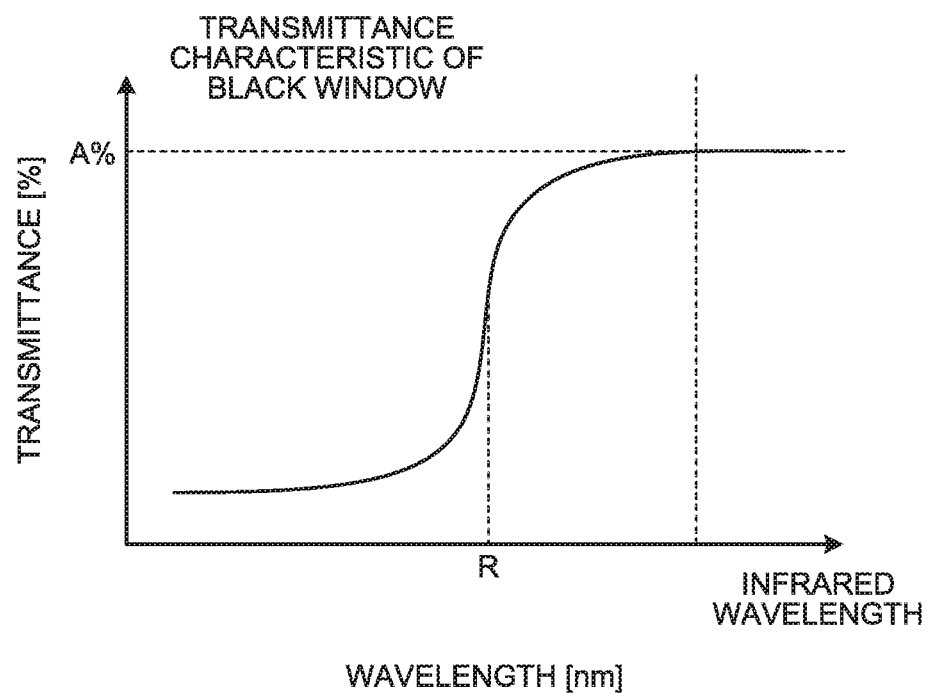
FIG. 4 is a graph illustrating a transmittance characteristic of a black window according to the first embodiment.
Figure 5:
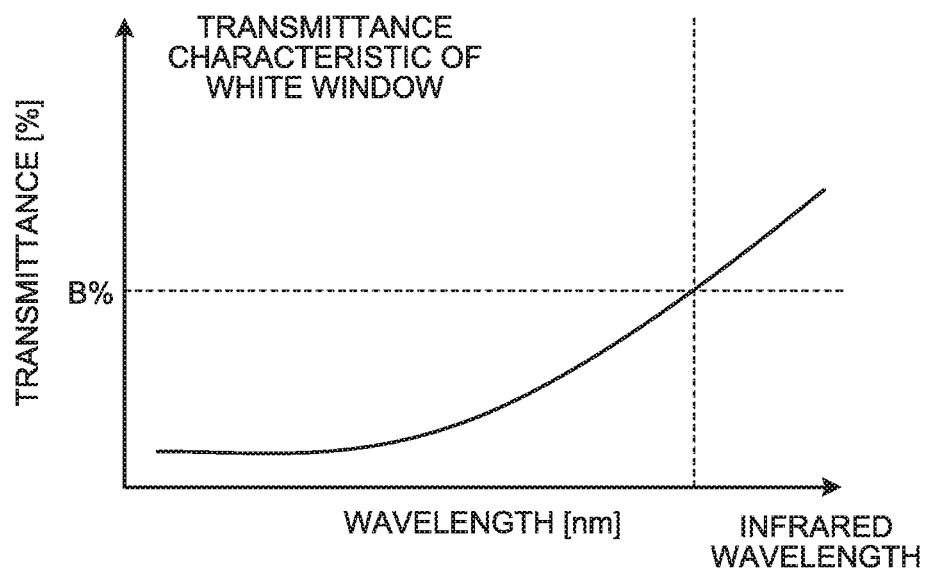
FIG. 5 is a graph illustrating a transmittance characteristic of a white window according to the first embodiment.
Figure 6:
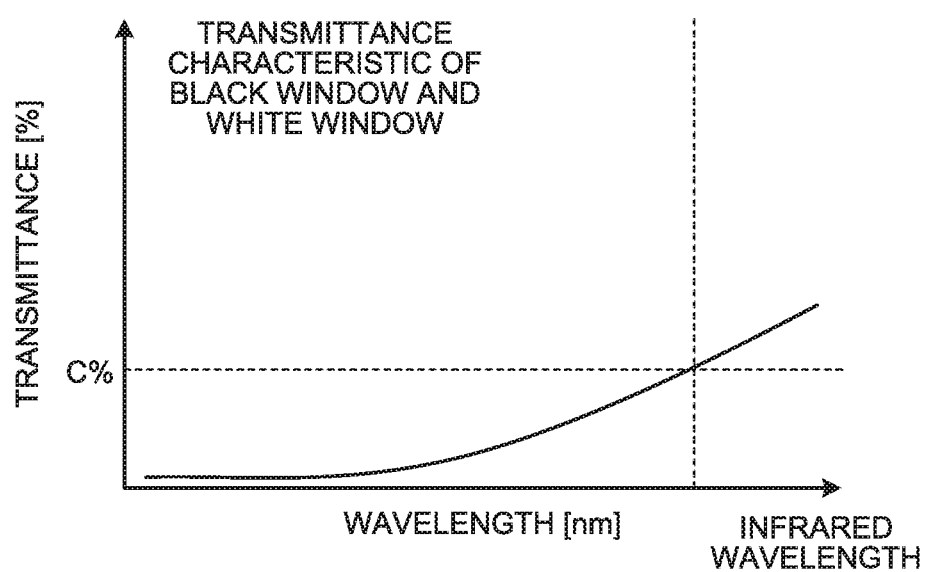
FIG. 6 is a graph illustrating a transmittance characteristic of the light-receiving window, which is a combination of the black window and the white window, according to the first embodiment.
Figure 7:
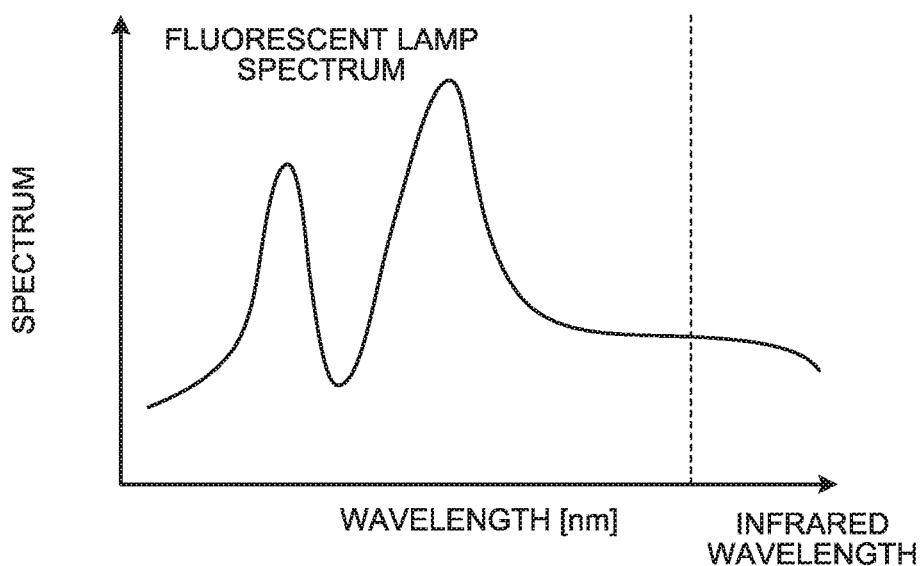
FIG. 7 is a graph illustrating a fluorescent lamp spectrum that is a frequency component of light emitted by a fluorescent lamp in the first embodiment.

FIG. 4 is a graph illustrating a transmittance characteristic of the black window 4. FIG. 5 is a graph illustrating a transmittance characteristic of the white window 5. FIG. 6 is a graph illustrating a transmittance characteristic of the light-receiving window 2, which is a combination of the black window 4 and the white window 5. FIG. 7 is a graph illustrating a fluorescent lamp spectrum that includes a frequency component of light emitted by a fluorescent lamp.

In FIGS. 4 to 6, a horizontal axis represents a wavelength; a vertical axis represents transmittance. As illustrated in FIG. 4, transmittance of the black window 4 rises as the wavelength increases. When a minimum value of the transmittance of the black window 4 in an infrared wavelength range is A %, a rate of rise of the transmittance of the black window 4 with respect to increase of the wavelength starts rising abruptly near a wavelength R that is shorter than the wavelengths in the infrared wavelength range. In contrast, as illustrated in FIG. 5, transmittance of the white window 5 rises gradually as the wavelength increases. In FIG. 5, a minimum value of the transmittance of the white window 5 in the infrared wavelength range is represented by B %.

In FIG. 7, a horizontal axis represents a wavelength; a vertical axis represents intensity of a spectrum, that is, light. As illustrated in FIG. 7, the intensity of a fluorescent lamp spectrum is low in the infrared wavelength range, while the intensity is high in a range of wavelengths shorter than the wavelengths in the infrared wavelength range. A material such as resin colored with a colorant such as a dye is typically used as the black window 4. The transmittance of the entire black window 4 can thus be adjusted by adjusting the amount of the colorant or the like; while the entire transmittance can be raised or lowered, it is difficult to adjust the transmittance for different wavelengths.

If the light-receiving window is configured by a black window 4 alone that is made of a material adjusted such that its transmittance is high in the infrared wavelength range, the fluorescent lamp noise 7 is also large, and thereby reception performance is degraded. In particular, the black window 4 is affected more significantly than the white window 5 by the fluorescent lamp noise 7, which has shorter wavelengths than the wavelengths of the infrared wavelength range. If the light-receiving window is configured by a black window 4 alone that is made of a material adjusted such that its transmittance is low in the infrared wavelength range, the infrared signal 6 is also weak; as the distance between the remote controller 20 and the air-conditioner main body 1 increases, a signal for actual entrance into the light-receiving element 3 is lowered in strength to an insufficient level with respect to a strength of a signal needed for the light-receiving element 3 and thus cannot be received by the light-receiving element 3. As described above, if the light-receiving window is configured by the black window 4 alone, a desired communication distance is not obtained in some cases.

To address this problem, the commonly used white window 5 is disposed between the black window 4 and the light-receiving element 3 in the first embodiment. This configuration can lower a ratio of transmittance in the range of wavelengths shorter than the wavelengths in the infrared wavelength range to transmittance in the infrared wavelength range, as illustrated in FIG. 6, in comparison with the black window 4 alone. In this manner, the transmittance in the infrared wavelength range can be raised while the fluorescent lamp noise 7 is reduced. In FIG. 6, a minimum value of transmittance of the black window 4 and the white window 5 combined in the infrared wavelength range is represented by Co.

Figure 8:
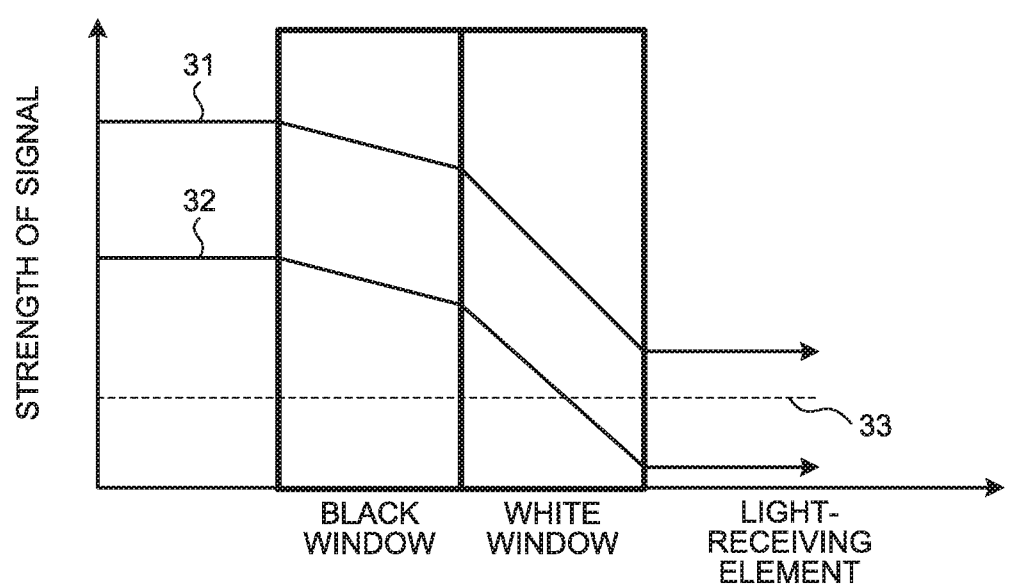
FIG. 8 is a schematic diagram illustrating strength of each signal passing through the black window and the white window according to the first embodiment.

FIG. 8 is a schematic diagram illustrating strength of each signal passing through the black window 4 and the white window 5. In FIG. 8, a vertical axis represents intensity of a signal, that is, light. FIG. 8 schematically illustrates reduction in strength of each signal due to the passage through the black window 4 and the white window 5 and illustrates intensity of each signal entering the light-receiving element 3. An infrared signal strength 31 represents a strength of an infrared signal that contains the operation instruction information; a fluorescent lamp noise strength 32 represents a strength of the fluorescent lamp noise 7; a required strength 33 represents a strength of a signal needed by the light-receiving element 3. As illustrated in FIG. 8, a ratio of the fluorescent lamp noise strength 32 to the infrared signal strength 31 is smaller after passage through the black window 4 and the white window 5 than after the passage through the black window 4 and before the passage through the white window 5. In this manner, use of the black window 4 and the white window 5, in place of the black window 4 alone, can reduce the ratio of the fluorescent lamp noise strength 32 to the infrared signal strength 31 while maintaining the strength of the signal needed by the light-receiving element 3.

The transmittance of the black window 4 and the transmittance of the white window 5 are set such that the transmittance Co of the combination of the black window 4 and the white window 5 in the infrared wavelength range achieves desired transmittance. The desired transmittance is, for example, transmittance that allows light that has a strength needed to achieve a desired communication distance to enter the light-receiving element 3. Transmittance of a typical white window that is used alone satisfies this requirement of the desired transmittance; thus, the transmittance of the black window 4 and the white window 5 according to the first embodiment has a value equivalent to the value of the transmittance of a typical white window that is used alone. The transmittance of a white window that is used alone is typically about 5% to 6%. In order to minimize reduction in strength of an infrared signal during passage of the signal through the black window 4, the black window 4 uses a material that achieves transmittance of about 70% to 90% in the infrared wavelength range when such a material is used as the black window 4 alone. Since the strength of a signal is reduced due to the presence of the black window 4, the transmittance of the white window 5 alone in the infrared wavelength range is set higher accordingly than the transmittance of a typical white window, such that the transmittance of the combination of the black window 4 and the white window 5 is set so as to be equivalent to the transmittance of a typical white window that is used alone, as described above.

In other words, the black window 4, which is a first light-receiving window, has transmittance equal to or greater than a first value in a first wavelength range that is an infrared wavelength range. The white window 5, which is a second light-receiving window, has transmittance equal to or greater than a second value in the first wavelength range, the second value being smaller than the first value. As described above, the transmittance of the black window 4 in the first wavelength range is, for example, equal to or greater than 70% and equal to or smaller than 90%. As described above, the transmittance of the white window 5 in the first wavelength range is, for example, greater than 5% as the transmittance of the while window 5 would be otherwise lowered than the transmittance of a typical white window in the first wavelength range, which is 5% to 6%. Transmittance of the light-receiving window 2, which is the combination of the black window 4 and the white window 5, in the infrared wavelength range is, for example, equal to or greater than 5% and equal to or smaller than 6%. Additionally, a ratio of the transmittance of the white window 5 in a second wavelength range that is a range of wavelengths shorter than the wavelengths in the first wavelength range to the transmittance of the white window 5 in the first wavelength range is smaller than a ratio of the transmittance of the black window 4 in the second wavelength range to the transmittance of the black window 4 in the first wavelength range. The second wavelength range is, for example, a range of wavelengths in which the fluorescent lamp noise 7 increases. Combining the black window 4 and the white window 5 as described above improves reception performance for an infrared signal and maintains a desired communication distance without impairing the design of the air conditioner.

In the present embodiment, the white window 5 is disposed between the black window 4 and the light-receiving element 3, and the transmittance of the black window 4 and the white window 5 achieves a desired value as described above. When the light-receiving window needs to be black in color due to design requirement, the present embodiment can provide improved reception performance for an infrared signal and maintain a desired communication distance without impairing the design.

Second Embodiment

Figure 9:
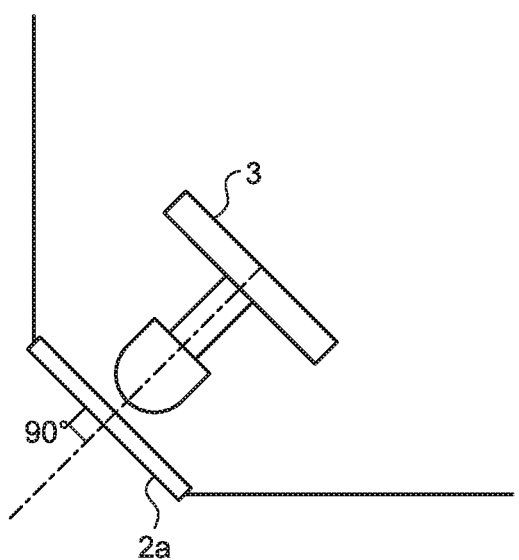
FIG. 9 is a diagram schematically illustrating a section of a light-receiving window according to a second embodiment and the light-receiving element.

FIG. 9 is a diagram schematically illustrating a section of a light-receiving window according to a second embodiment and the light-receiving element. An air-conditioner main body according to the present embodiment is similar to the air-conditioner main body of the first embodiment except that it includes a light-receiving window 2a, in place of the light-receiving window 2, and that the light-receiving window 2a and the light-receiving element 3 are disposed in a manner as described below. A difference from the first embodiment is described below.

While the black window 4 and the white window 5 are used as the light-receiving window 2 in the first embodiment, the light-receiving window 2a according to the second embodiment may be defined by the black window 4 and the white window 5 as in the case with the first embodiment or by the black window 4 alone.

As illustrated in FIG. 9, the light-receiving element 3 and the light-receiving window 2a, which are built in the air-conditioner main body according to the second embodiment, are disposed such that a normal line to a light-receiving surface of the light-receiving element 3 is perpendicular to the light-receiving window 2a. That is, the light-receiving window 2a and the light-receiving element 3 are disposed such that the light-receiving window 2a and the light-receiving surface of the light-receiving element 3 are parallel with each other. A light-receiving range of the light-receiving window 2a can be thus maximized, and thereby a strength of an infrared signal that enters the light-receiving element 3 can be increased.

Since the light-receiving element 3 is disposed perpendicularly to the light-receiving window 2a, as described above, the light-receiving range of the light-receiving window 2a can be maximized to thereby provide improved signal-receiving performance for an infrared signal and maintain a desired communication distance.

The configurations in the embodiments described above represent some examples of the present invention, and they can be combined with another publicly known technique and partially omitted or modified without departing from the present invention.

The invention claimed is:

1. An air conditioner comprising:
 a remote controller to transmit an infrared signal containing operation instruction information; and
 an air-conditioner main body,
 the air-conditioner main body comprising:
  a first light-receiving window to allow the infrared signal to pass through the first light-receiving window, the first light-receiving window having a first transmittance in a first wavelength range that is an infrared wavelength range
  a light-receiving element to receive the infrared signal; and
  a second light-receiving window disposed between the first light-receiving window and the light-receiving element and having a second transmittance in the first wavelength range, the second transmittance being smaller than the first transmittance,
 wherein the first light-receiving window has a third transmittance in a second wavelength range, and the second light-receiving window has a fourth transmittance in the second wavelength range, the second wavelength range being a range of wavelengths shorter than wavelengths in the first wavelength range,
 wherein a ratio of the fourth transmittance of the second light-receiving window in the second wavelength range to the second transmittance of the second light-receiving window in the first wavelength range is respectively smaller than a ratio of the third transmittance of the first light-receiving window in the second wavelength range to the first transmittance of the first light-receiving window in the first wavelength range,
 wherein the first light-receiving window is made from a resin with a black pigment, and the second light-receiving window is made from a transparent resin with a white pigment,
 wherein the first transmittance of the first light-receiving window in the first wavelength range is equal to or greater than 70% and equal to or smaller than 90%, and
 wherein transmittance of a light-receiving window that is a combination of the first light-receiving window and the second light-receiving window in the first wavelength range is equal to or greater than 5% and equal to or smaller than 6%.

2. The air conditioner according to claim 1, wherein a normal line to a light-receiving surface of the light-receiving element is perpendicular to the first light-receiving window and the second light-receiving window.

3. An indoor unit of an air conditioner, to receive an infrared signal containing operation instruction information, the indoor unit comprising:
 a first light-receiving window to allow the infrared signal to pass through the first light-receiving window, the first light-receiving window having a first transmittance in a first wavelength range that is an infrared wavelength range;
 a light-receiving element to receive the infrared signal; and
 a second light-receiving window disposed between the first light-receiving window and the light-receiving element and having a second transmittance in the first wavelength range, the second transmittance being smaller than the first transmittance,
 wherein the first light-receiving window has a third transmittance in a second wavelength range, and the second light-receiving window has a fourth transmittance in the second wavelength range, the second wavelength range being a range of wavelengths shorter than wavelengths in the first wavelength range,
 wherein a ratio of the fourth transmittance of the second light-receiving window in the second wavelength range to the second transmittance of the second light-receiving window in the first wavelength range is smaller than a ratio of third transmittance of the first light-receiving window in the second wavelength range to the transmittance of the first light-receiving window in the first wavelength range, the second wavelength range being a range of wavelengths shorter than the wavelengths in the first wavelength range,
 wherein the first light-receiving window is made from a resin with a black pigment, and the second light-receiving window is made from a transparent resin with a white pigment,
 wherein the first transmittance of the first light-receiving window in the first wavelength range is equal to or greater than 70% and equal to or smaller than 90%, and
 wherein transmittance of a light-receiving window that is a combination of the first light-receiving window and the second light-receiving window in the first wavelength range is equal to or greater than 5% and equal to or smaller than 6%.

4. The air conditioner according to claim 3, wherein a normal line to a light-receiving surface of the light-receiving element is perpendicular to the first light-receiving window and the second light-receiving window.

* * * * *